United States Patent [19]
Schrodi et al.

[11] Patent Number: 5,202,885
[45] Date of Patent: Apr. 13, 1993

[54] ATM EXCHANGE WITH COPYING CAPABILITY

[75] Inventors: Karl Schrodi, Heimsheim; Gert Eilenberger, Kirchheim; Bodo Pfeiffer, Schwieberdingen; Bozo Cesar, Stuttgart, all of Fed. Rep. of Germany

[73] Assignee: Alcatel N.V., Amsterdam, Netherlands

[21] Appl. No.: 668,160

[22] Filed: Mar. 12, 1991

[30] Foreign Application Priority Data

Mar. 14, 1990 [DE] Fed. Rep. of Germany ....... 4008078

[51] Int. Cl.$^5$ .............................................. H04J 3/24
[52] U.S. Cl. ................................... 370/94.1; 370/60
[58] Field of Search ...................... 370/94.1, 94.3, 65, 370/60, 59

[56] References Cited

U.S. PATENT DOCUMENTS

| | | | |
|---|---|---|---|
| 4,700,184 | 10/1987 | Noirel et al. | 370/94.1 |
| 4,700,344 | 10/1987 | Kaino et al. | 370/94 |
| 4,701,906 | 10/1987 | Ransom et al. | 370/94.1 |
| 4,926,416 | 5/1990 | Weik | 370/60.1 |
| 4,956,839 | 9/1990 | Torii et al. | 370/60 |
| 4,983,962 | 1/1991 | Hammerstrom | 370/94.3 |
| 4,991,171 | 2/1991 | Teraslinna et al. | 370/94.1 |
| 5,067,123 | 11/1991 | Hyodo et al. | 370/60 |

FOREIGN PATENT DOCUMENTS

| | | |
|---|---|---|
| 3816747 | 11/1989 | Fed. Rep. of Germany . |
| 55-140347 | 11/1980 | Japan . |
| 63-246055 | 10/1988 | Japan . |
| 87/00372 | 1/1987 | PCT Int'l Appl. . |

OTHER PUBLICATIONS

Eng et al, "Multicast and Bradcast Services in a Knockout Packet Switch", *IEE Infocom 88* (New Orleans), Mar. 1988, pp. 29-34.

W. Schmidt, "The communication technology in the integrated packet transmitting systems", *Der Fernmelde=Ingenieur* 41/9 (Sep. 1987) pp. 6-9.

J. S. Turner "Design of a Broadcast Packet Network" IEEE 1986 pp. 667-675.

J. M. Cotton, et al., "ITT 1240 Digital Exchange Digital Switchin Network", Electrical Communication, vol. 56, No. 2/3, 1981.

W. Schmidt, "Die Vermittlungstechnik in integrierten Paket Ubermittlungs-systemen-Einfuhrung und Systemubersicht", De Fernmelde=Ingenieur, No. 9, Sep. 1987.

*Primary Examiner*—Douglas W. Olms
*Assistant Examiner*—Shick Hom
*Attorney, Agent, or Firm*—Brunell & May

[57] ABSTRACT

In practice, switching is a continuously changing mixture of point-to-point connections, point-to-multipoint connections with low fanout, and point-to-multipoint connections with high fanout. The switching elements of a switch optimized for point-to-point connections are additionally enabled to copy a few input signals for an arbitrary number of outputs, so that a very large number of copies is attainable for few input signals. This switch is supplemented by a copy switch which serves exclusively to make limited numbers of copies for a large number of input signals, which are then switched in the (group) switch as point-to-point connections. Point-to-point connections are operated as connectionless connections, but outside the switch act as virtual connections. Point-to-multipoint connections are operated as virtual connections (connection-oriented) by means of connection tables.

4 Claims, 3 Drawing Sheets

ATM EXCHANGE WITH COPYING CAPABILITY

TECHNICAL FIELD

The present invention relates to an ATM exchange with copying capability for switching ATM cells.

BACKGROUND ART

This application is based on claims priority from an application first filed in Germany under Application No. P 40 08 078.1. To the extend such prior application may contain any additional information that might be of any assistance in the use and understanding of the invention claimed herein, it is hereby incorporated by reference.

CLAIM FOR PRIORITY

Known are, on the one hand, a succession of a copy switch, a distribution switch, and a destination switch (routing switch) and, on the other hand, a switch in which copying is possible in each stage.

Real operation is a mixture of point-to-point connections, point-to-multipoint connections with low fanout, and point-to-multipoint connections with high fanout. Total traffic and the individual shares change continuously. Each of the prior art structures is optimized for only one particular type of traffic.

DISCLOSURE OF INVENTION

The object of the present invention is to provide an ATM exchange with copying capability which is equally adapted to different types of traffic, including changing types. The fundamental idea of the invention is to additionally enable the switching elements of a switching network ("switch") optimized for point-to-point connections to copy a few input signals for an arbitrary number of outputs, so that a very large number of copies is attainable for few input signals. This group switch is supplemented by a copy switch which serves exclusively to make limited numbers of copies for a large number of input signals, which are then switched in the group switch as point-to-point connections.

Point-to-point connections are operated as "connectionless connections" by automatic control of the switching elements. It is ensured that these connections act as virtual connections toward the outside. In the group switch, too, point-to-multipoint connections are operated as virtual connections (connection-oriented) by means of connection tables.

"Connectionless connections" are those connections in which the individual cells of a connection do not follow the same path but are distributed to all possible paths. This results in quite uniform loading; traffic measurements can be dispensed with, so that the devices required for this purpose are not necessary. However, it is necessary to watch the correct order of the cells since mutual overtaking cannot be ruled out.

"Connectionless connections" require switching elements which are controlled directly by an address contained in the path information. With such addressing, copies for point-to-multipoint connections are very difficult to make. Examples of such switching elements are known in the art.

Also known are switching elements which are controlled by indirect addressing. In that case, the path information consists of connection numbers which are evaluated in each switching element with the aid of connection tables. If a connection number is contained in the connection table of a switching element for more than one output, a copy of a cell with this connection number is delivered at each of these outputs.

Particularly in the case of point-to-multipoint connections, constant changes of subscribers may result in nonuniform loading of the group switch. However, being designed primarily for "connectionless connections", the group switch must have devices at its outputs which serve to assure the correct order of the cells after any mutual overtaking. It is therefore readily possible to rearrange existing virtual connections. Short-time mutual overtaking is corrected as in the case of "connectionless connections".

The use of connection numbers for point-to-multipoint connections in the group switch necessitates special precautions if a connection number is to be used multiply. In any case, the total number of point-to-multipoint connections possible in the group switch is limited. On the other hand, however, all lines leaving the group switch could be involved in such a point-to-multipoint connection.

To be able to permit more point-to-multipoint connections at a time, a separate copy switch is provided. From each input of the exchange, one input of the copy switch must be accessible. It is not necessary for every input of the copy switch to be accessible from every input of the exchange. The copy switch is preferably accessed via the group switch, with each input of the exchange connected to one input of the group switch, and each input of the copy switch connected to one output of the group switch.

The function of the copy switch is to make the respective number of copies required. Each of these copies is switched in the group switch in the manner of a point-to-point connection. The copy switch need not be capable of providing a path from every input to every output. The number of stages depends only on the copying ability of the individual switching elements (i.e., on the number of outputs of the switching elements) and on the maximum number of copies required. As a rule, a copy switch with few stages (e.g., two-to three-stage switch with 16×16 switching elements) is sufficient. Here, each connection number can be used multiply; in this respect, therefore, the number of simultaneous connections possible in the copy switch is hardly limited.

An exchange of such a design can handle any type of traffic. Local internal blocking either cannot occur (point-to-point connections) or can be resolved at any time without disturbances (point-to-multipoint connections). Changeover between the two possibilities of point-to-multipoint connections can be effected at any time to adapt the loading to the current situation. In this way, very uniform loading of the group switch can be achieved. However, partial blocking by fully loaded serving trunks or an excessive total load cannot be prevented.

It may appear disadvantageous that special switching elements are necessary in the group switch which are addressable in two different modes. However, these switching elements can also be used where either of the two addressing modes is not needed, e.g., in the copy switch. Such switching elements can thus be employed as universal switching elements.

BRIEF DESCRIPTION OF DRAWINGS

The invention will become more apparent from the following description, of an embodiment taken in conjunction with the accompanying drawings, in which.

BEST MODE FOR CARRYING OUT THE INVENTION

Figure 1:
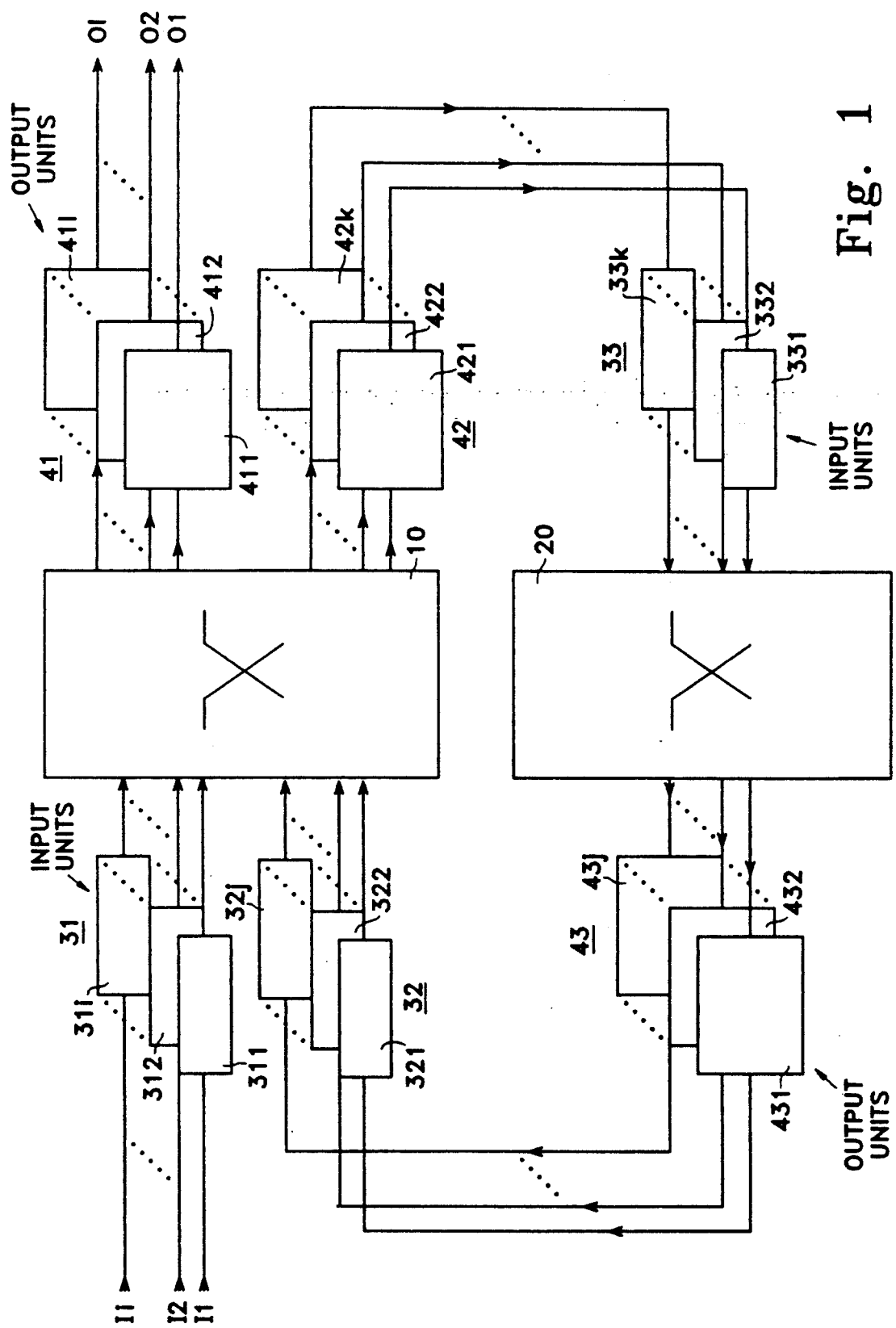
FIG. 1 shows a preferred embodiment of an exchange in accordance with the invention.

The ATM (Asynchronous Transfer Mode) change shown in has inputs I1, I2, . . . , I$i$, outputs 01, 02, . . . , 01, a group switch 10, a copy switch 20, three groups of input units 31, 32 and 33, and three groups of output units 41, 42 and 43. Group 31 contains i input units 311, 312, . . . , 31$i$; group 32 contains j input units 321, 322, . . . , 32$j$; group 33 contains k input units 331, 332, . . . , 33$k$; group 41 contains l output units 411, 412, . . . , 41$l$; group 42 contains k output units 421, 422, . . . , 42$k$, and group 43 contains j output units 431, 432, . . . , 43$j$.

Each of the inputs I1, I2, . . . , I$i$ of the exchange is connected to the input of one of the input units 311, 312, . . . , 31$i$ of group 31, whose outputs are each coupled to one input of the group switch 10. Each of the outputs 01, 02, . . . , 01 of the exchange is connected to the output of one of the output units 411, 412, . . . , 41$l$ of group 41, whose inputs are each connected to one output of the group switch 10.

The inputs of the output units 421, 422, . . . , 42$k$ of group 42 are connected to additional outputs of the group switch 10. The output of each of the output units 421, 422, . . . , 42$k$ of group 42 is connected to the input of one of the input units 331, 332, . . . , 33$k$ of group 33, whose outputs are coupled to inputs of the copy switch 20.

The input of each of the output units 431, 432, . . . , 43$j$ of group 43 is connected to one output of the copy switch 20. The output of each of the output units 431, 432, . . . , 43$j$ of group 43 is coupled to the input of one of the input units 321, 322, . . . , 32$j$ of group 32, whose outputs are connected to additional inputs of the group switch 10. For the present invention it is of no consequence whether the inputs I1, I2, . . . , I$i$ and the outputs 01, 02, . . . , 01 are connected only to other exchanges or also to subscriber stations, private branch exchanges or front-end equipment. As a rule, the number of inputs, i, will be equal to the number of outputs, l, i.e., i=l.

The group switch 10 contains a plurality of switching elements arranged in several stages. It is so designed that connections are possible between every input and every output. Examples of such switches are familiar to those skilled in the art.

The individual switching elements are designed to be switchable, by information contained in the cell header, between a first addressing mode, in which the cell is passed on based on the basis of path information evaluated by means of an algorithm that cannot be influenced from outside, and a second addressing mode, in which the cell is passed on based on path information evaluated with the aid of a connection table. In the second addressing mode, a cell can also be copied and passed on over two or more paths.

ATM switching elements which are addressed by means of an algorithm that cannot be influenced from outside are just as familiar to those skilled in the art as ATM switching elements addressed by means of a connection table.

A suitable algorithm is, for example, the one described in J. M. Cotton et al, "ITT 1240 Digital Exchange Switching Network", Electrical Communication, Vol. 56, No. 2/3, 1981, pages 148–160. There it is possible to address a particular output line identified by the path information. It is also possible to select any output line via the path information. The selection of a particular channel within an output line, which is also described, is neither possible nor necessary in ATM. It is practical, however, to select any output line from a predetermined group of output lines via the path information. For this selection, the instantaneous load may be taken into consideration. It is also possible to address a device in the switching element by means of the path information, e.g., in order to change the connection table necessary for the second addressing mode.

The connection table necessary for the second addressing mode may be a RAM with M address bits and N data bits. The address bits are formed by the path-information bits for the respective switching element, and the data bits indicate the output line on which the cell is to be placed. If two or more data bits are set simultaneously, the cell is placed on two or more output lines, whereby copying of cells is achieved in a simple manner. Instead of using a single RAM, a RAM with M address bits and one data bit may be associated with each output, e.g., a 128×1 RAM for M=7.

The switching elements must be designed so as to be able to operate in two different modes. A structure suitable for this purpose is the one described with reference to FIGS. 3 and 5 of commonly assigned U.S. Pat. No. 4,9256,416 (Weik). The partial switching elements 22 and 24 described there must be replaced here by one partial switching element for the first addressing mode and one partial switching element for the second addressing mode.

The group switch 10 is optimized for point-to-point connections. To this end, it is designed and operated in such a manner that in the first half each cell takes an arbitrary path, so that traffic is evenly distributed. In the second half, each cell is routed to the desired output. Therefore, each switching element of the middle stage must be accessible from every input of the group switch and must have access to every output of the group switch.

The group switch is preferably a folded network. Each switching element of the first stage is also a switching element of the last stage. Part of its inputs is connected to inputs of the group switch, and another part is connected to outputs of switching elements of the next to the last switching stage. Part of its outputs is connected to inputs of switching elements of the second switching stage, and another part is connected to outputs of the group switch. Each switching element of the second stage is also a switching element of the next to the last stage, etc. The number of stages is odd. Such folded networks are known from time-division multiplex systems, e.g., from the above-cited article entitled "ITT 1240 Digital Exchange Digital Switching Network". They have the advantage that the middle stages need not necessarily be used for every connection.

The copy switch 20 may be constructed from the same switching elements, but only one of the addressing modes is used here. Unlike in the group switch 10, however, it is not necessary for each input to have access to every output. Only a predetermined number of outputs must be accessible from each input. Also, each input need not necessarily have access to the same number of outputs. The copy switch 20 may therefore consist of two portions, one in which each input has access to 128 outputs and one in which each input has access to 32 outputs. It must, of course, be taken into account that the traffic carried increases from the input toward the output of the copy switch as a function of the average copying factor.

Even though, because of the increase in traffic caused by the copying, the number of output units in group 42, which is equal to the number of input units in group 33, is less than the number of output units in group 43, which is equal to the number of input units in group 32, it is possible to permanently associate each input unit of group 32 with an output unit of group 42 and each output unit of group 43 with an input unit of group 33. Instead of associating units of group 43 with units of group 33, it is possible to combine the output units of group 43 with the corresponding input units of group 32 and the output units of group 42 with the corresponding input units of group 33. The association or combination should permit at least the exchange of control data.

Together with the design of the group switch 10 as a folded network, it is thus possible for all parts of the exchange (input and output units, switching elements) to exchange control data in a simple manner via the normal connecting paths. Via additional inputs and outputs of the group switch 10, various auxiliary devices may be connected which can exchange control data with all other parts of the exchange in a similar fashion. However, control, diagnosis and maintenance do not form part of the present invention.

As for the input and output units, it should be noted that all exchanges have some kinds of input and output units. The following describes only what is specific to the invention.

The functions of each input unit include adding path information to each cell to be switched. Reference is made to pages 6 to 9 of an article by W. Schmidt in "Der Fernmelde=Ingenieur", No. 9, September 1987, where the basic switching sequence is described. The cell header of each cell must include a connection-specific label. From the latter, the input unit determines path information for the subsequent switching network with the aid of a table, and this path information is added to the cell. It is not necessary to distinguish between the two addressing modes, since the data formats must be identical.

In the penultimate paragraph on page 7 of the above-cited article, reference is made to "Systeme, die mit Zeitmarken arbeiten" (systems which operate with time stamps). In such systems, "the time of arrival of a packet must be determined and added to the packet information at the input of the node". If these time stamps provide sufficiently fine resolution, they can also be used to label the order of the cells. Even if actually no time stamps are needed, the same approach can be used to label the order. It is also possible, however, to use independent modulo-N counters in each input unit to allocate these labels, hereinafter also referred to as "labels of a first kind". Since the correct order must only be assured between the cells of each connection, the connection numbers, if present, can be used as an elimination criterion; they will hereinafter be referred to as "labels of a second kind". The labels of a first kind can be allocated both separately for the cells of each connection and jointly for the cells of all connections routed through one input unit.

If what is regarded here as an input unit is only what must be added in accordance with the invention to a conventional ATM exchange, an input unit is needed only if the cells coming from outside do not already contain a label identifying their order or if this label is not readily utilizable.

An embodiment of an output unit will now be described with the aid of FIGS. 2 and 3. All output units are basically identical; they differ essentially by the predetermined delay.

The fundamental idea of this embodiment is to hold each cell at the output until it is certain that no older cell can be buffered in the switching network. Before the cell is passed on, a check is made to determine whether one of the cells that arrived at the output later than that cell is to be output earlier than that cell.

This is preferably implemented by providing a buffer at the output end which is operated, at least in part, in the manner of a shift register, thereby introducing a predetermined delay. Prior to the output of a cell, at least the shift-register-like portion of the buffer is examined as to whether a cell written in later is to be output earlier; if so, the two cells are interchanged.

In this embodiment of an output unit, a data stream is assumed in which all bits of a cell are transferred simultaneously over parallel lines. As a rule, that is neither the case nor particularly advantageous. On the one hand, however, it is always possible to produce such a data stream by means of serial-to-parallel converters, parallel-to-serial converters, and buffers, and on the other hand, those skilled in the art will be readily able to adapt the present embodiment to a specified data format as is used, for example, in an ATM exchange. In that case, it will be advantageous or even necessary to store in the buffer not the cells themselves, but only the information required to rearrange and retrieve the cells stored in a separate memory. Indirect addressing is familiar to those skilled in the art. It can be readily used in the example shown; then, instead of the data, the addresses of the data are stored.

Figure 2:
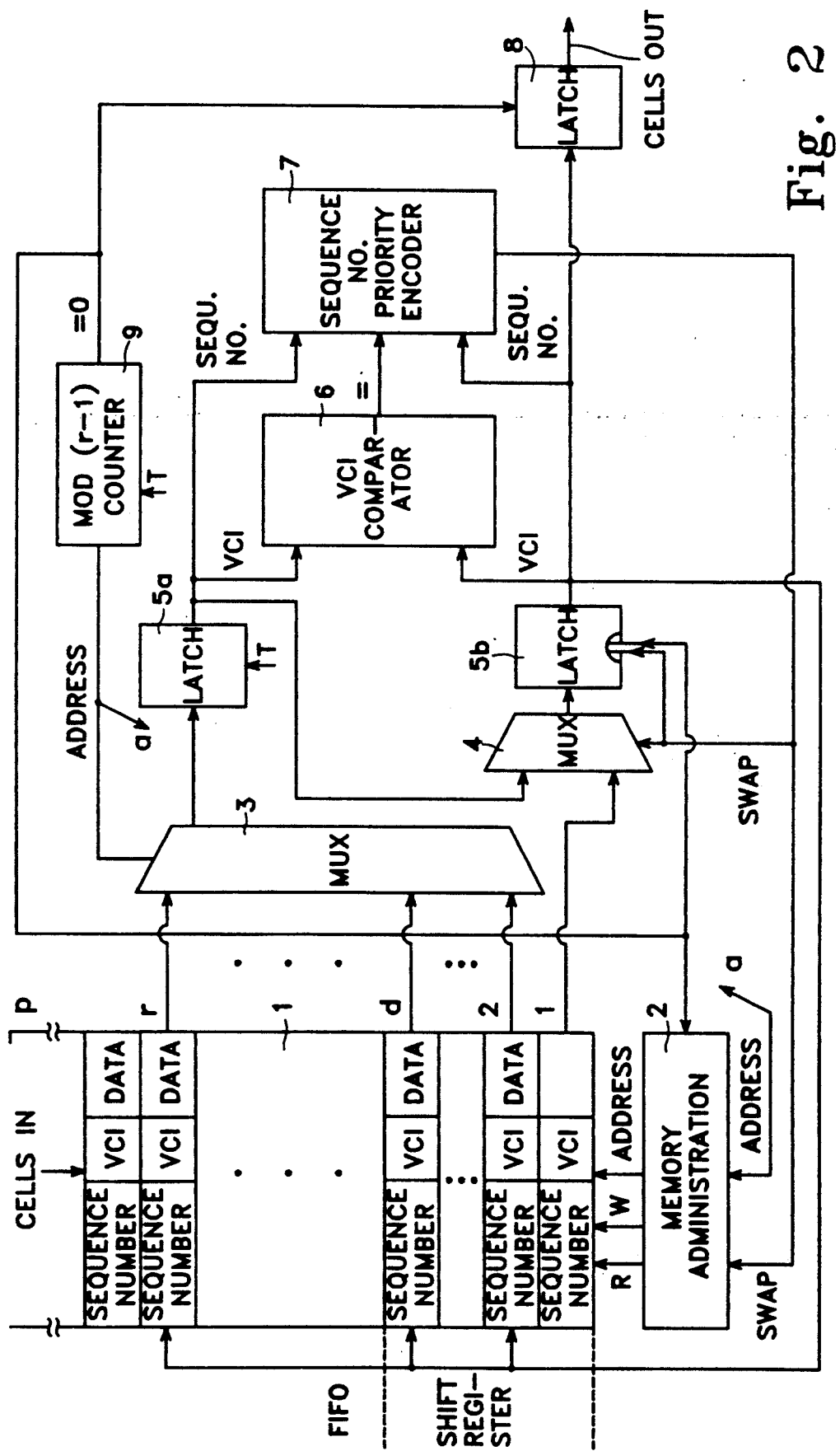
FIG. 2 is a block diagram of an output unit for the exchange in accordance with the invention.
Figure 3:
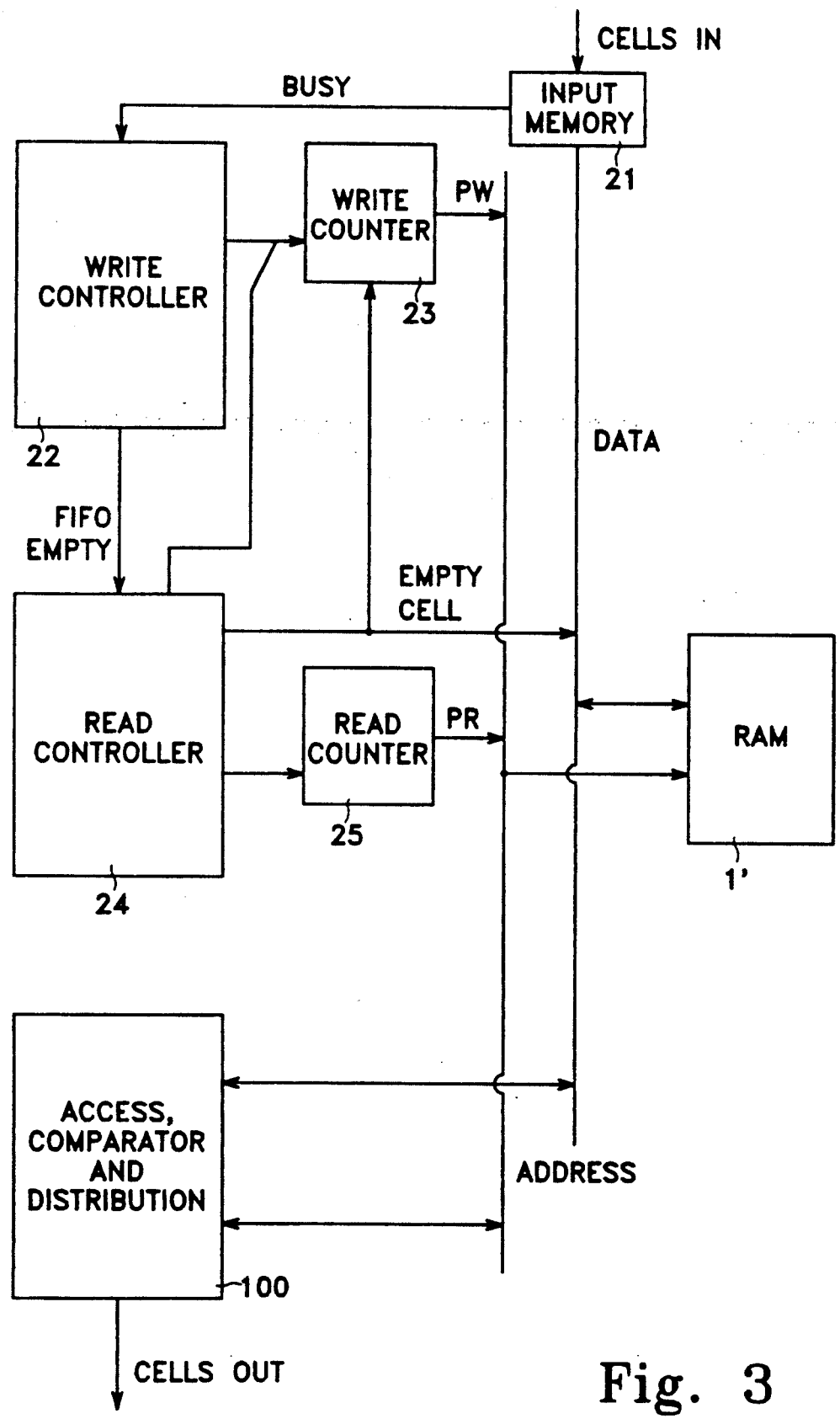
FIG. 3 shows an implementation of the buffer included in the output unit of FIG. 2.

The output unit shown in FIG. 2 includes a buffer 1, a memory management unit 2, two multiplexers 3 and 4, two latches 5a and 5b, two comparators 6 and 7, an additional latch 8, and a counter 9.

The buffer 1 has p locations. Each location is capable of containing one complete cell. According to an important aspect of the invention, each cell consists of a label of a first kind, designated "Sequence Number", a label of a second kind, designated VCI (=Virtual Circuit Identifier), and the remainder of the cell, designated "Data". The representation of FIG. 2 does not illustrate the actual memory requirements of the individual parts correctly.

To allocate the labels of a first kind, use is preferably made of a modulo-N counter, with N having to be chosen so large that within a predetermined time, less than N/2 numbers are allocated as labels of a first kind. Because of the periodic occurrence of all numbers, there must be a sufficient distance in both directions to obtain unambiguity. With the specified choice of N, all those cells can be unambiguously reconstructed in their original order which are not farther than said predetermined time apart when the numbers are being allocated. This time must then be preset so that, except for the permitted error rate, it is ensured that within this time each cell passes through the last r locations of the buffer 1. An approximate guide value for the time to be preset is twice the difference between the maximum delay and the minimum delay between the allocation of the labels of a first kind and the arrival in the output unit.

The label of a second kind, VCI, identifies the association of a cell with a particular virtual connection.

Instead of the remainder of the cell, "Data", the address where this remainder in stored in another memory may be stored in the buffer 1.

The buffer 1 is divided into three portions, namely a shift-register-like portion, labelled "Shift Register", with locations 1 through d, and a portion operated in the manner of a FIFO memory, labelled "FIFO", which, in turn, is composed of two portions with locations $d+1$ through r and $r+1$ through p, respectively. At least locations 1 through r must be individually accessible such that their contents can be read or that new contents can be written into them.

The buffer size, i.e., the choice of the numerical values for d, r and p, depends on the specific application. The main considerations are the permissible error rate, the minimum and maximum delays of a cell from the first branching point, the number of simultaneous connections permitted via one output unit, the minimum and maximum numbers of cells permitted for a connection per unit of time, and the permissible variation of the number of cells per unit of time. For a typical application, a simulation yielded values of $d=10$, $r=34$ and $p=330$ if only one pass through the group switch 10 has to be compensated for. For point-to-multipoint connections, which pass first through the group switch 10, then through the copy switch 20 and then through the group switch 10 again, the above values have to be multiplied by a factor of about 2 to 2.5, at least if the correct order is restored only at the output in group 41. The above-mentioned values are only coarse guide values. The choice of the range of values for the labels of a first kind, "Sequence Number", is dependent on the above values. For these numerical values and the connection-oriented determination of these labels, a guide value is $N=512$.

Cells arriving at the input of the output unit, which are labelled "Cells in", are first examined as to whether they are cells to be transferred out at the output or cells ending in the output unit. These are, on the one hand, empty cells and, on the other hand, cells containing the control signals for the output unit (or an input unit commonly connected to the latter which is not otherwise reachable). The cells to be output are entered into the buffer 1, such that they first "fall through" to the lowest free location in the portion operated in the manner of a FIFO memory. Whenever a cell is fed out at the output, all cells in the buffer move down by one location. If the last location of the FIFO memory, $d=1$, is occupied, the cell contained therein will be transferred into the first location of the shift register, d. If location $d+1$ is empty, an empty cell must be written into location d. The residence time of each cell, at least relative to any other cell, can thus be derived from its position in the buffer 1. The output from the buffer 1 will be described below.

The memory management unit 2 is shown in FIG. 2 highly schematically. It has a dual function. First, it manages the above-described normal operation of the buffer 1. This is done by applying addresses, labelled "Address", write instructions, W, and read instructions, R. Also required (not shown in FIG. 2) is information as to the presence or absence of a cell to be written in. The second function of the memory management unit 2 is to exchange the contents of the location addressed by the counter 9, "Address", for the contents of the latch 5b if an instruction, "Swap", is given to do so.

Through the multiplexer 3, the contents of any one of locations 2 through r of the buffer 1 can be accessed on a selective basis and transferred into the latch 5a. The memory location is selected by the counter 9, "Address".

At the beginning of an output cycle, the contents of location 1 of the buffer 1 are transferred to the latch 5b through the multiplexer 4. That will be the case when the counter 9 is reset, "=0". A special instruction, Swap, applied to the multiplexer 4 causes the contents of the latch 5a to be transferred to the latch 5b. The fact that by means of the same instruction, Swap, data is written into and read from the latch 5b is nothing unusual and can be taken into account by taking measures familiar to those skilled in the art.

The comparator 6 compares the labels of a second kind, VCI, of those two cells which are currently stored in the latches 5a and 5b. Only if the two labels of a second kind are equal, i.e., if the two cells belong to the same connection, will the subsequent comparator be activated.

The comparator 7 compares the labels of a first kind, "Sequence Number", of the two cells contained in the latches 5a and 5b. If the comparator 6 indicates that the two cells belong to the same connection, and the comparator 7 indicates that the cell contained in the latch 5a is older than that contained in the latch 5b, an instruction, Swap, will be provided which causes the older cell to be transferred to the latch 5b and the younger cell to take the place of the older cell in the buffer 1. The two cells are thus interchanged.

The counter 9 provides the correct timing. It counts periodically from 2 to r at a predetermined clock rate T.

If the counter 9 is reset, "=0", at the count r, one output cycle will be terminated and the next output cycle will be started. The contents of the latch 5b, found in the previous cycle to be the oldest cell belonging to a particular connection, are transferred to the latch 8 and are available at the output of the latter, "Cells out". At the same time, the contents of location 1 of the buffer 1 are transferred through the multiplexer 4 to the latch 5b. After that, locations 2 through r are successively searched for older cells (labels of a first kind) of the same connection (labels of a second kind). To this end, the contents of each of these locations are transferred through the multiplexer 3 to the latch 5a and compared by means of the comparators and 7. The above-described exchange actions, Swap, ensure that at the count r of the counter 9, the oldest cell of the connection being considered is actually stored in the latch 5b, and that all younger cells of this connection are still or again contained in the buffer 1.

The representation of the output unit in FIG. 2 illustrates mainly the operation of the output unit. The construction and management of the buffer, which consists of a portion operated in the manner of a FIFO memory and a portion operated in the manner of a shift register, are apparent from FIG. 3. The clock distribution, including the distribution of the write and read instructions, is not shown in FIG. 3.

The buffer is implemented with a random-access memory (RAM), 1'. The incoming cells are applied through an input memory 21 to a data bus, "Data", to which the random-access memory 1' is connected. A write controller 22 is activated, "Busy", by the input memory 21 when a cell to be written in is applied. Via the write counter 23, an address PW is applied over an address bus, "Address", to the random-access memory 1', and the cell is written into the latter. The write counter 23 is then incremented from the write controller 22. A read controller 24 specifies via a read counter 25 the address, PR, which corresponds to location 1. After each cell output, the read counter 25 is incremented from the read controller 24. The difference between the contents PW of the write counter 23 and the contents PR of the read counter 25 must always be at least equal to d. This is monitored by the write controller 22; if this condition is not fulfilled, "FIFO empty", this will be signalled to the read controller 24, which will apply an empty cell, "Empty Cell", to the data bus, "Data", and cause this empty cell to be written into the location specified by the write counter 23. The read controller 24 will then increment the write counter 23.

The remainder of the output unit is indicated by an access, comparator, and distribution unit 100.

Following are examples of possible further modifications of the output unit.

During the search for the oldest cell of a connection, it is not absolutely necessary that a relatively older cell be exchanged several times for the cell to be fed out. It suffices to search the entire memory area, to retain only the position and age of the oldest cell found, and to exchange only once at the end of the search process.

It is also possible not to exchange at all and to output the oldest cell first.

The shift-register-like portion of the buffer need not necessarily form the end of the buffer. It may also be located at the beginning or in the middle of the buffer.

In conclusion, examples of possible further modifications of the exchange will be given.

It is not imperative for the copy switch 20 to be accessible through the group switch 10. As an example of an exchange with several switching networks, reference is made to DE 38 16 747 A1. In FIG. 5 of that patent application, the incoming and outgoing traffic is divided in input and output units 17 and 18 among several switching networks. Also shown are connections between the switching networks. As shown in FIG. 3a of the above-cited article, for example, the digital switching network of SYSTEM 12, too, is divided into different switching networks, the traffic being divided by a separate access switch. However, the switching networks shown there ("planes") are identical.

It is not imperative that the original order of the cells be restored at the output of each switching network. It suffices to do this before the cells leave the exchange, i.e., in group 41. There, however, calls which have to pass through the group switch 10 only once and calls which have to pass through the group switch 10 twice and, in addition, through the copy switch 20 occur on one and the same output line and, consequently, in one and the same output unit. Hence, either the minimum delay must be chosen to be very long for all connections, which also requires a corresponding amount of storage space, or the minimum delay must be switchable on a connection-oriented basis. To this end, each of the output units could be divided into two parallel output subunits with different minimum delays.

The amount of storage space required depends not only on the design of the exchange and the specified permissible error rates but also on the mode of operation. Since copies can be made both in the group switch 10 and in the copy switch 20, point-to-multipoint connections can be routed both along a short path, i.e., only through the group switch 10, and along a long path, i.e., twice through the group switch 10 and, in addition, through the copy switch 20. Now, however, changeover between the two modes is to be possible at any time so as to be able to adapt the operation to the instantaneous loading. This would mean an extreme value of the differential delay to be compensated for. This can be avoided by routing all point-to-point connections via the copying switch 20. Cells to be copied in the group switch 10 would then have to reach the latter as a point-to-point connection via the group switch 10 and the copy switch 20 and would have to be copied only during the second pass through the group switch 10. Since only very few such connections are possible, the additional load would present no problems. However, considerable savings could be achieved in the buffers in the output units of group 41.

Typical examples of point-to-multipoint connections are conference circuits and sound or television broadcasts. The associated cells represent a continuous signal stream. They are formed in the transmitter at constant intervals and are needed in the receiver not only in the correct order but also at the original constant intervals.

The regular restoration of constant intervals is not only technically complicated but also requires a different treatment of cells of different origin. It is simpler to provide the same delay for all cells. Output units which ensure the same delay for all cells automatically assure the correct order of cells of the same connection.

Even though an exactly equal delay of all cells cannot be ensured in ATM, it is possible in the output units to sort the cells according to time stamps contained therein and then output the cells one after the other when the delay determined by the time stamp is reached. This requires a correspondingly accurate time distribution to all input and output units.

For ATM, and not only for distribution services, it is advantageous to provide equal delays for all cells, i.e., to compensate for delay jitter. If this is combined with the restoration of the correct cell sequence as just indicated, the cost and complexity involved may be quite adequate to the advantage gained. In this very case it is advantageous to effect a compensation immediately after each pass through a switching network, i.e., also in groups 42 and 43. The amount of storage required is minimized. Since the number of output units in groups 42 and 43 is small compared to that in group 41, and savings are possible in the output units of group 41, considerable overall savings are achieved.

It may be practical to have to use as few different components or assemblies as possible which, however, are slightly more expensive, but it may be just as practical to permit a greater variety of types if the individual assemblies are simpler in construction.

In view of the foregoing, different variants may be advantageous. The output units of group 42 and those of group 43 may each be present separately or not. Even if the original order has already been restored in either of the groups 42 and 43, it may be advantageous to use the same sequence labels again in the next output units in group 41 at the latest. Therefore, the input units of group 33 and those of group 32, too, may each be present separately or not. Then, however, group 33 must not be present if group 42 is not present; group 32 must not be present if group 43 is not present.

We claim:

1. ATM (Asynchronous Transfer Mode) exchange with copying capability for switching cells each having path information included in a cell header, said exchange comprising a group switch comprising
   a plurality of group switch inputs,
   a plurality of group switch outputs,
   a plurality of group switch switching elements arranged in several stages for providing a plurality of connections between each group switch input and each group switch output, each of said switching elements having a respective alterable connection table and being individually switchable, by information contained in the cell header, between a first addressing mode independent of said alterable connection table and a second addressing mode, in which point-to-multipoint path information in the cell header is evaluated with the aid of said alterable connection table to cause the cell to be copied and passed on over a plurality of paths,
   a plurality of exchange outputs,
   a plurality of output units, each between the group switch and a different respective exchange output, each of said output units including
      a buffer into which all cells to be outputted via said output unit are written after leaving the group switch, and from which the cells are outputted in an order determined by a sequencing label contained in the cell header,
   a plurality of exchange inputs, and
   a copy switch having
      a plurality of copy switch inputs, each said copy switch input accessible from each said exchange input,
      a plurality of copy switch outputs, each connected to a respective one of a first group of said group switch inputs, and
      means for making multiple copies of any of said cells appearing at any of said copy switch inputs and for outputting each of said multiple copies at respective different said copy switch outputs,
   wherein at least some of said group switch inputs may be directly connected to respective exchange inputs such that at least some cells routed from an exchange input to one or more exchange outputs pass only through said group switch and do not pass through said copy switch.

2. An exchange as claimed in claim 1, wherein the exchange inputs are connected to the copy switch via the group switch.

3. An exchange as claimed in claim 2, wherein said copy switch further comprises
   a plurality of copy switch output units, each coupled between a respective copy switch output and its associated group switch input.

4. An exchange as claimed in claim 3, further comprising a plurality of input units, each coupled between a respective output unit of the copy switch and a respective input of the group switch, for adding said sequencing labels to the respective cell headers after the cells have been resequenced by the output units associated with the copy switch.

* * * * *